United States Patent [19]

van den Bogert et al.

[11] Patent Number: 5,070,273
[45] Date of Patent: Dec. 3, 1991

[54] LOW-PRESSURE MERCURY VAPOR DISCHARGE LAMP WITH FLAT DISCHARGE VESSEL AND EXTERNAL SIDE ELECTRODES

[75] Inventors: Willem J. van den Bogert; Christianus J. Roozekrans; Markus W. M. Wanninkhof, all of Eindhoven, Netherlands

[73] Assignee: U.S. Philips Corporation, New York, N.Y.

[21] Appl. No.: 308,359

[22] Filed: Feb. 8, 1989

[30] Foreign Application Priority Data

Feb. 15, 1988 [NL] Netherlands .......................... 8800478

[51] Int. Cl.$^5$ ..................... H01J 61/35; H01J 61/30
[52] U.S. Cl. ..................... 313/607; 313/234; 313/493; 313/634; 359/48
[58] Field of Search ............... 313/607, 234, 493, 634, 313/485; 315/248; 350/345

[56] References Cited

U.S. PATENT DOCUMENTS

| | | | |
|---|---|---|---|
| 1,935,940 | 11/1933 | Case | 313/607 X |
| 2,465,414 | 3/1949 | Abshire | 313/243 X |
| 4,126,384 | 11/1978 | Goodman et al. | 350/345 |
| 4,153,861 | 5/1979 | Warner et al. | 313/234 X |
| 4,266,167 | 5/1981 | Proud et al. | 315/248 |
| 4,851,734 | 7/1989 | Hamai et al. | 313/607 X |

FOREIGN PATENT DOCUMENTS 61-4152A 1/1986 Japan.
2205439 12/1988 United Kingdom ............... 313/234

*Primary Examiner*—Palmer C. DeMeo
*Attorney, Agent, or Firm*—Brian J. Wieghaus

[57] ABSTRACT

Low-pressure mercury vapor discharge lamp having a discharge vessel filled with mercury and a rare gas, which discharge vessel comprises two substantially parallel, mainly rectangular flat glass plates located at a relatively short distance from each other and being transparent to light, which plates are connected together in a gas-tight manner proximate their circumference and form upright walls. Electrodes, between which a discharge is maintained in the discharge vessel during operation arranged on the outer side of the discharge vessel. The electrodes are in the form of strips of conducting material which are arranged on at least two facing upright walls and which extend substantially throughout the length of these walls.

18 Claims, 2 Drawing Sheets

LOW-PRESSURE MERCURY VAPOR DISCHARGE LAMP WITH FLAT DISCHARGE VESSEL AND EXTERNAL SIDE ELECTRODES

BACKGROUND OF THE INVENTION

The invention relates to a low-pressure mercury vapour discharge lamp having a discharge vessel filled with mercury and a rare gas, which discharge vessel comprises two substantially parallel, mainly rectangular flat glass plates which are located at a relatively short distance from each other and which are transparent to light, said plates being connected together in a gas-tight manner proximate their circumference and forming upright walls. Electrodes are arranged on the outer side of the discharge vessel between which a discharge is maintained in the discharge vessel during operation. A lamp of this type is known from Japanese Patent Application 61-4152(A) laid open to public inspection.

These flat lamps are used as light sources for rear exposure of information display devices comprising liquid crystal material and having a flat display screen.

Such a display device comprises, for example a chamber having two electrically insulating transparent plates between which liquid crystal material is present. The surfaces of the insulating plates facing the liquid crystal material are provided with planar electrodes. Dependent on the potential difference between the electrodes and a special polarizer, bright symbols are displayed against a dark background, and conversely, by means of the light source placed behind the display device. The said light source exposing the display device particularly on the rear side is preferably a fluorescent low-pressure mercury vapour discharge lamp having a flat rectangular discharge vessel as described inter alia in the said Japanese Patent Application. Such a light source has a high brightness and the rear side of the display device is exposed over a maximum possible surface area.

In the flat discharge vessel of the known lamp the electrodes are arranged on the outer side of the flat substantially rectangular glass plates and they are formed as thin transparent conducting layers (comprising, for example conducting indium oxide) which layers extend substantially throughout the surface. The glass plates are substantially rectangular but this is also understood to mean a square, though small deviations such as roundings may be possible. During operation of the lamp a high-frequency alternating voltage is maintained between the electrodes causing ultraviolet radiation in the discharge vessel which is converted into visible light by a luminescent layer provided on the inner wall of the discharge vessel. However, it has been found that due to the relatively large surface area of the electrodes in the known lamp the discharge readily contracts in the discharge vessel during operation, resulting in local intensity differences. To prevent such a contraction of the discharge, the distance between the said plates should be determined very accurately. Such an accuracy requirement must also be imposed on the thickness of the said glass plates. This is troublesome and hence timeconsuming and costly, notably in lamps manufactured in a mass production process.

SUMMARY OF THE INVENTION

It is an object of the invention to provide a lamp having a construction in which the above-mentioned drawback is obviated as much as possible.

According to the invention a lamp of the type described in the opening paragraph is therefore characterized in that the electrodes are in the form of strips of conducting material which are arranged on at least two facing upright or side walls and which extend substantially throughout the length of said walls.

A lamp according to the invention has a high light output and a homogeneous brightness throughout the surface area. Since the electrodes only extend on the upright or side walls of the flat discharge vessel, the electrodes can easily be provided and they need not be transparent. These lamps can therefore be manufactured in a relatively simple way.

In a special embodiment of the lamp according to the invention the electrodes extend on the upright side walls adjoining the long sides of elongate rectangular glass plates. It has been found that the lamp then ignites readily. Moreover, the lamp has a homogeneous brightness.

In another embodiment of the lamp according to the invention each electrode extends on two adjoining upright side walls, while some space is present between the ends of the electrodes at the location of two diagonally facing corners of the discharge vessel. The advantage of such a lamp is that notably in a discharge vessel having relatively large dimensions (for example, with rectangular glass plates of 20×30 cm) the discharge is readily established and is evenly distributed over the discharge vessel.

The electrodes are in the form of strips of conducting material, for example a cured conducting paste. However, each electrod preferably comprises a thin aluminium foil adhered to the outer wall and being present on substantially the complete surface area of a side wall. Such a foil can easily be provided (for example by means of a suitable glue or cement) realizing a reliable adhesion to the relevant side walls. A qualitatively satisfactory adhesion is important for a homogeneous discharge between the electrodes.

In a special embodiment of the lamp the electrodes are L-shaped in cross-section. The electrodes cover substantially one of said plates and extend on a part of the side wall-adjoining said glass plate. The electrodes are electrically insulated from each other by a gap-shaped opening present between the electrodes, said gap located preferably symmetrically between the side walls.

Electrodes are formed in this manner which extend both on the side walls and on one of the plates (preferably the rear side of the plate-shaped discharge vessel). It has been found that the ignition voltage of the lamp is then relatively low and that the discharge is evenly distributed in the entire discharge vessel during operation. An additional advantage is that the part of the electrodes on the flat rear wall also functions as a reflector increasing the light output. In fact, a flat discharge lamp according to the invention is preferably used as a light source behind an information display device comprising liquid crystal material. Such display devices for alphanumerical information are used, for example in colour television screens and in information panels at airports, railway stations, banks, etc.

BRIEF DESCRIPTION OF THE DRAWINGS

The invention will now be described in greater detail, by way of example, with reference to the accompanying drawings in which.

Figure 1:
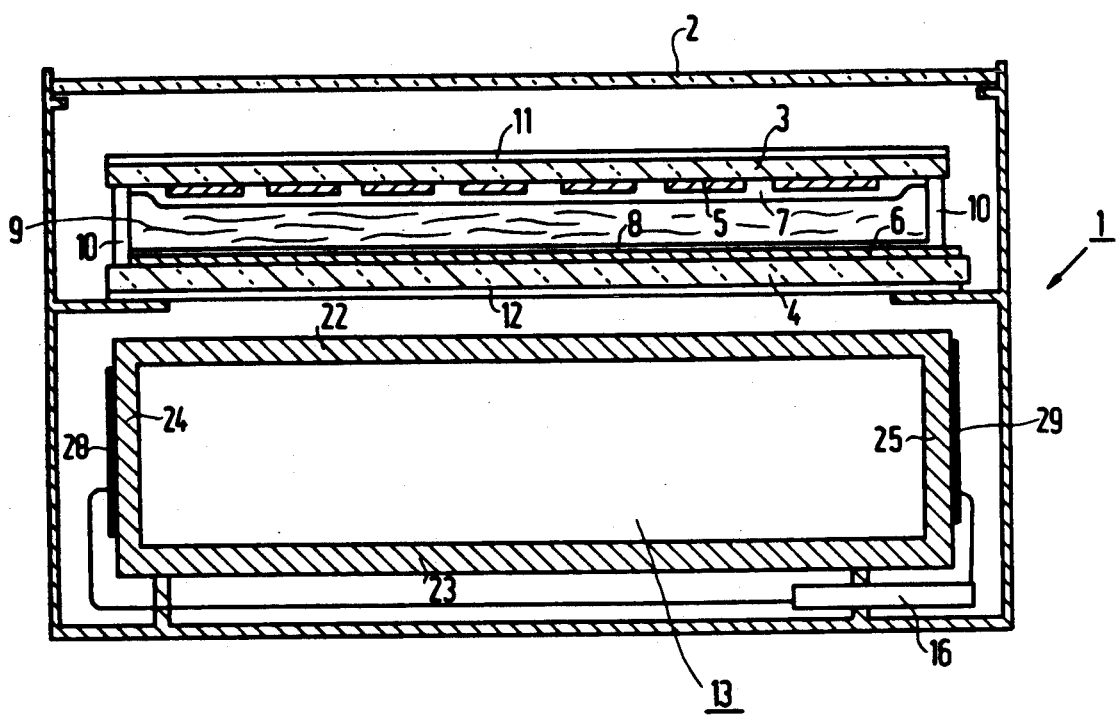
FIG. 1 is a diagrammatic cross-sectional view of an information display device with an embodiment of a low-pressure mercury vapour discharge lamp according to the invention.

The device of FIG. 1 comprises a rectangular, elongate synthetic material thin-walled housing 1 whose upper side is at least partly closed by a transparent plate 2. The housing accommodates a liquid crystalline display device comprising two glass supporting plates 3 and 4 which are provided with electrodes 5 and 6 comprising material which is conventionally used in the LCD technique. Orientation layers 7 and 8 are provided on the supporting plate surfaces provided with electrodes. A liquid crystal material 9 is present between the supporting plates. The distance between the plates 3 and 4 is several microns in this example. In the drawing the dimensions are not in conformity with reality. They are exaggerated for the sake of clarity. A sealing edge 10 connects the supporting plates at their circumference. The supporting plates are also provided with a linear polarizer (such as 11) and an analyzer 12.

Electrode 6 may be a single electrode which functions as a counter electrode for all electrodes 5 provided in a given arrangement. For the further operation of this display device reference is made to European Patent Application No. 0,255,158 laid open to public inspection, which corresponds to U.S. application Ser. No. 068,504.

One side of the said display device is exposed by a low-pressure mercury vapour discharge lamp 13 according to the invention having a rectangular flat discharge vessel. This lamp will be described in greater detail with reference to FIG. 2. The lamp is operated by means of two electrodes 28 and 29 between which a high-frequency voltage is maintained by means of the supply unit 16 shown diagrammatically.

Figure 2:
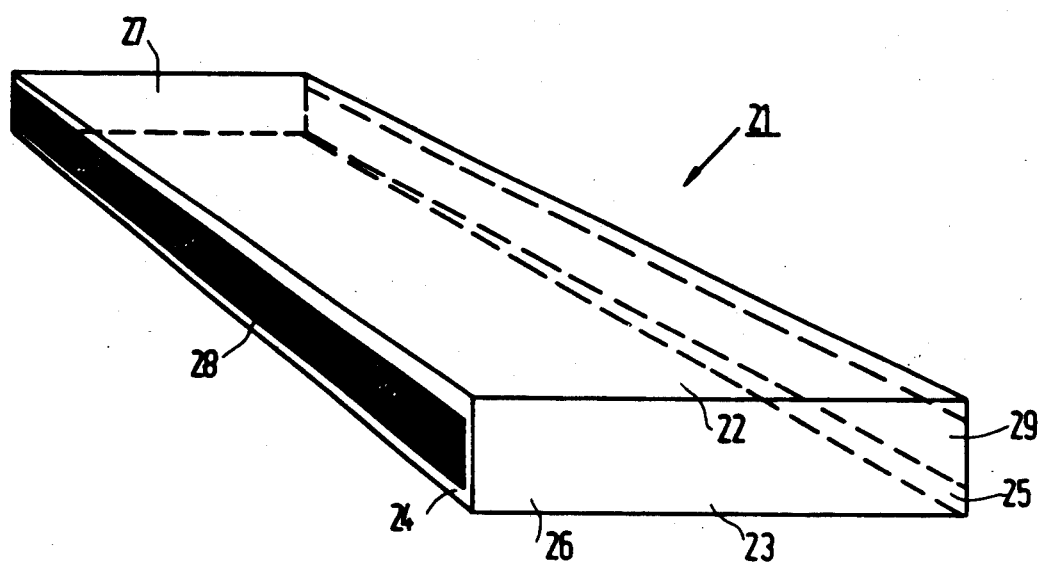
FIG. 2 is a perspective view of the lamp of FIG. 1.

The lamp of FIG. 2 has a discharge vessel 21 which is filled with mercury and a rare gas. The discharge vessel comprises two substantially parallel, rectangular glass plates 22 and 23 located at a relatively short distance from each other and being transparent to light, which plates are connected together in a gas-tight manner at their circumference. (see also FIG. 1). Side walls 24, 25, 26 and 27 are then formed. The inner sides of the glass plates 22 and 23 and of the walls 24 to 27 are provided with a luminescent layer which converts the ultraviolet radiation generated in the discharge vessel into visible light. The electrodes 28 and 29 are arranged on the outer side of the side walls 24 and 25. These electrodes are in the form of strips of conducting material (such as a foil of aluminium) which extend substantially throughout the length of the walls. These strips are secured to the outer side of the walls by means of a cement. A discharge is maintained between these electrodes during operation of the lamp by applying a high-frequency voltage between these electrodes. As is apparent from the drawing, the electrodes extend on the upright walls which adjoin the long sides of the rectangular glass plates. In a practical embodiment a high-frequency voltage of approximately 300 V with a frequency of between 1 and 20 MHz is applied between the electrodes 28 and 29. The dimensions of the plates 22 and 23 are 100×75 mm. The height of the upright walls is approximately 9 mm so that contraction of the discharge during lamp operation is avoided.

Figure 3:
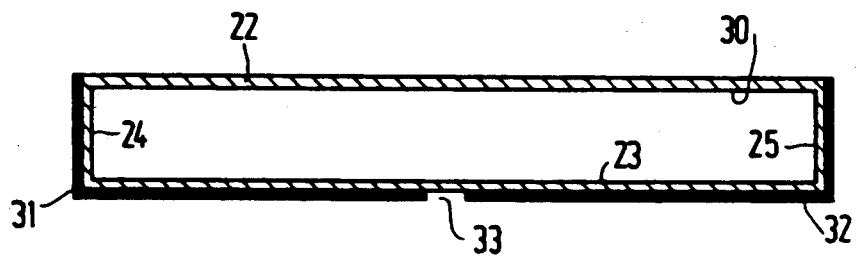
FIG. 3 is a cross-section of a second embodiment of the lamp according to the invention.

The discharge vessel of a lamp, shown in FIG. 3, of another embodiment according to the invention has also a rectangular shape. The same components have the same reference numerals as in the lamp of FIG. 2. A luminescent layer 30 (comprising in a practical embodiment a mixture of three phosphors as described in U.S. Pat. No. 3,937,998) is present on the inner wall of the discharge vessel. The electrodes 31 and 32 extend throughout the length of the discharge vessel, are L-shaped in cross-section and also extend on a part of the side wall-adjoining outer surface of plate 23. However, for ready ignition of the lamp a rectangular gap-shaped opening 33 is present halfway the plate 23. It is not necessary for the parallel edges of the electrodes 31 and 32 adjoining the gap 33 to be formed as straight lines. They may also be curved or knurled. During operation of the lamp a voltage of approximately 300 V with a frequency of approximately 5 MHz is applied between these electrodes. The electrodes 31 and 32 comprise an L-shaped bent aluminium foil having a thickness of approximately 100 μm.

Figure 4:
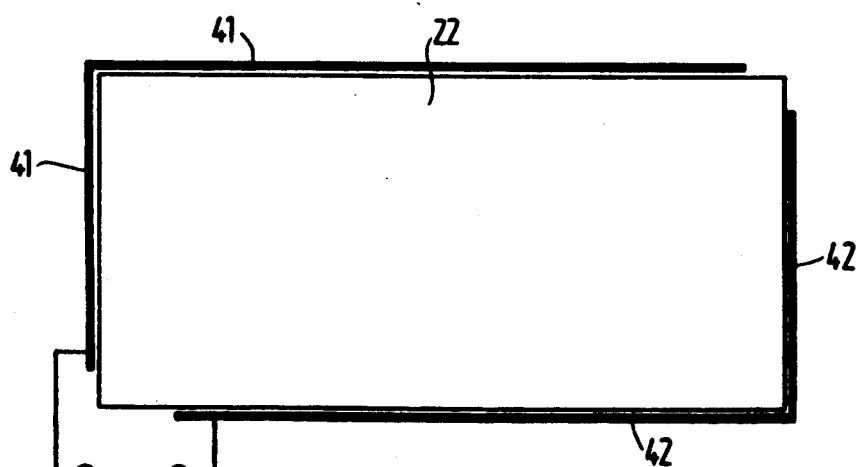
FIG. 4 is a diagrammatic plan view of a third embodiment of the lamp according to the invention.

The embodiment of FIG. 4 only shows the upper flat rectangular glass plate 22 of the discharge vessel. This is the side of the discharge vessel from which the light emerges. The two electrodes extend on two adjoining walls. These electrodes are denoted by 41 and 42. Some space between the ends of the two electrodes 41 and 42 is present at the location of two diagonally facing corners of the discharge vessel. Proximate one end the electrodes are connected to a high-frequency supply unit 43.

We claim:

1. A low-pressure mercury vapour discharge lamp comprising a discharge vessel filled with mercury and a rare gas, said discharge vessel comprising two substantially parallel mainly rectangular glass plates which are located at a relatively short distance from each other and which are transparent to light, side walls connecting said plates together in a gas-tight manner proximate their circumference, and electrodes between which a discharge is maintained in the discharge vessel during operation being arranged on the outer side of the discharge vessel, characterized in that the electrodes are strips of conducting material which are arranged on at least two facing side walls and which extend substantially throughout the length of said two facing side walls, said side walls on which said electrodes extend being substantially flat and not intruding into said discharge space.

2. A low-pressure mercury vapour discharge lamp as claimed in claim 1, characterized in that the electrodes extend on the side walls adjoining the long sides of said rectangular glass plates.

3. A low-pressure mercury vapour discharge lamp as claimed in claim 2, characterized in that each electrode extends on two adjoining side walls, the ends of the electrodes being spaced from each other at the location of two diagonally facing corners of the discharge vessel.

4. A low-pressure mercury vapour discharge lamp as claimed in claim 3, characterized in that the strips comprise an aluminium foil adhered to the wall.

5. A low-pressure mercury vapour discharge lamp as claimed in claim 4, characterized in that the electrodes additionally cover the major part of one of said plates for reflecting light through the opposing glass plate, said electrodes being electrically separated by a gap on said one plate.

6. A low-pressure mercury vapour discharge lamp as claimed in claim 1, characterized in that each electrode extends on two adjoining side walls, the ends of the electrodes being spaced from each other at the location of two diagonally facing corners of the discharge vessel.

7. A low-pressure mercury vapour discharge lamp as claimed in claim 6, characterized in that the strips comprise an aluminum foil adhered to the wall.

8. A low-pressure mercury vapour discharge lamp as claimed in claim 7, characterized in that the electrodes additionally cover the major part of one of said plates for reflecting light through the opposing glass plate, said electrodes being electrically separated by a gap on said one plate.

9. A low-pressure mercury vapour discharge lamp as claimed in claim 1, characterized in that the strips comprise an aluminum foil adhered to the wall.

10. A low-pressure mercury vapour discharge lamp as claimed in claim 9, characterized in that the electrodes additionally cover the major part of one of said plates for reflecting light through the opposing glass plate, said electrodes being electrically separated by a gap on said one plate.

11. A low-pressure mercury vapour discharge lamp as claimed in claim 2, characterized in that the electrodes additionally cover the major part of one of said plates for reflecting light through the opposing glass plate, said electrodes being electrically separated by a gap on said one plate.

12. A low-pressure mercury vapour discharge lamp as claimed in claim 1, characterized in that the electrodes additionally cover the major part of one of said plates for reflecting light through the opposing glass plate, said electrodes being electrically separated by a gap on said one plate.

13. An information display device having a housing with a flat display screen, said housing accommodating a low pressure mercury vapour discharge lamp comprising a discharge vessel filled with mercury and a rare gas, said discharge vessel comprising two substantially parallel mainly rectangular glass plates which are located at relatively short distance from each other and which are transparent to light, side walls connecting said plates together in a gas-tight manner proximate their circumference, and electrodes arranged on the outer side of the discharge vessel between which a discharge is maintained in the discharge vessel during operation, characterized in that said electrodes are strips of conducting material which are arranged on at least two facing side walls and which extend substantially throughout the length of said two facing side walls, said side walls in which said electrodes extend being substantially flat and not intruding into said discharge space.

14. A low-pressure mercury vapour discharge lamp as claimed in claim 13, characterized in that the electrodes extend on the walls adjoining the long sides of said rectangular glass plates.

15. An information display device as claimed in claim 14, characterized in that the electrodes additionally cover the major part of one of said plates for reflecting light through the opposing glass plate, said electrodes being electrically separated by a gap.

16. An information display device as claimed in claim 13, characterized in that each electrode extends on two adjoining side walls, the ends of the electrodes being spaced from each other at the location of two diagonally facing corners of the discharge vessel.

17. An information display device as claimed in claim 16, characterized in that the electrodes additionally cover the major part of one of said plates for reflecting light through the opposing glass plate, said electrodes being electrically separated by a gap on said one plate.

18. An information display device as claimed in claim 13, characterized in that the electrodes additionally cover the major part of one of said plates for reflecting light through the opposing glass plate, said electrodes being electrically separated by a gap on said one plate.

* * * * *